Oct. 26, 1965

HIDEO SAGARA 3,213,713

PLANETARY GEAR DEVICE

Filed May 23, 1961

Oct. 26, 1965  HIDEO SAGARA  3,213,713
PLANETARY GEAR DEVICE
Filed May 23, 1961  2 Sheets-Sheet 2
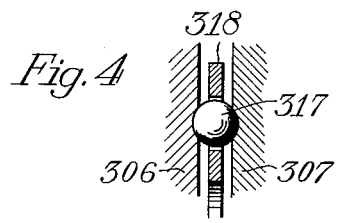
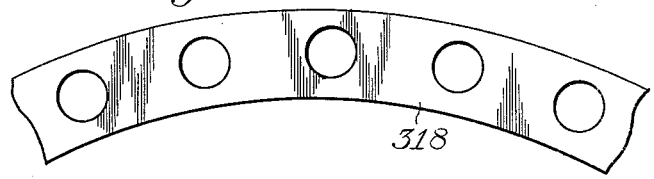
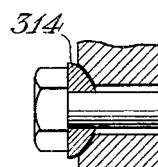
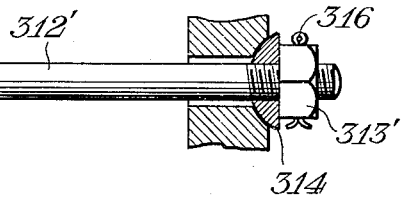
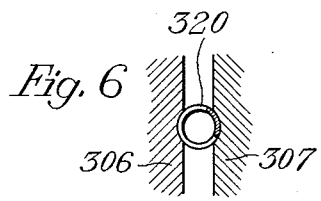
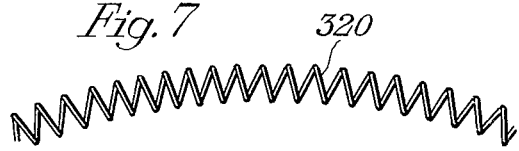

United States Patent Office 3,213,713
Patented Oct. 26, 1965

3,213,713
PLANETARY GEAR DEVICE
Hideo Sagara, Hiroshima, Japan, assignor to Mitsubishi Shipbuilding & Engineering Co., Ltd., Tokyo, Japan, a company of Japan
Filed May 23, 1961, Ser. No. 112,024
Claims priority, application Japan, May 24, 1960, 35/25,078; June 1, 1960, 35/26,169; July 5, 1960, 35/30,047; July 15, 1960, 35/31,154, 35/31,155
12 Claims. (Cl. 74—801)

This invention relates to planetary gear devices.

Most of the present-day planetary gear devices normally comprise operating gear elements including double helical teeth formed thereon. It is well known that the use of double helical gears in a planetary gear device is advantageous in that it increases the number of simultaneously meshed teeth resulting in smooth meshing and in that two juxtaposed toothed portions of the double helical gear tend to be equally loaded to thereby compensate for unevenness of contact between the teeth even in the case when a tooth breadth is wide or a gear box is deformed.

On the other hand, the double helical gear element as to its helical angle, tooth profile, tooth thickness, etc., must be precisely machined with unusual technical skill. Especially, if it is desired to produce a double helical gear having a unitary structure, machining operations including tooth cutting, shaving, lapping and the like are required to be performed with greater technical skill and with more time-consuming labor as compared with the case of making a spur gear or a single helical gear. Therefore, the finished product is expensive. In addition, the double helical gear should be necessarily provided on its periphery between the toothed portions with a circumferential groove of substantial width serving as an open space into which a working portion of a cutting tool or a grinding wheel can be withdrawn. This makes the axial dimension of the finished gear larger and has a tendency to bend the gear shaft and to twist the gear box. Also the gears may irregularly mesh each other.

A general object of the invention is to eliminate the abovementioned disadvantages.

An object of the invention is to provide a planetary gear device including spur gear and/or single helical gear elements and which functions to equalize the load applied thereto as in the conventional planetary gear device including double helical gear elements.

Another object of the invention is to provide a planetary gear device of the type described in the preceding paragraph and including an increased number of simultaneously meshed teeth to maintain smooth meshing of the gear elements.

According to the invention there is provided a planetary gear device comprising a plurality of abutting sun gear elements, a plurality of abutting internal gear elements disposed coaxially with said sun gear elements, a plurality of planet gear groups disposed between said sun gear elements and said internal gear elements, each of said planet gear groups including a plurality of abutting planet gear elements meshing both said sun gear elements and said internal gear elements, said sun gear elements, said internal gear elements and said planet gear elements being equal in number, frame means for rotatably supporting said planet gear groups, and at least a pair of single helical gear couplings toothed in opposite directions for couplings at least two selected from either of said internal gear elements and said sun gear elements to either of a casing and a sun gear shaft respectively whereby the coupled gear elements are allowed to effect relative rotational movement in the direction of rotation but prevented from relative axial movement.

All the gear elements may be of either spur gear type or single helical gear type. In the latter case either a sun gear unit or a internal gear unit may preferably comprise a pair of axially abutting gear elements which, in turn, are connected to each other through a pair of single helical gear couplings toothed in opposite directions.

In order to increase the number of simultaneously meshed teeth, the abutting gear elements may be offset from each other by a predetermined fraction of their tooth pitch, for example a half thereof.

A plurality of connecting rods may preferably be provided for connecting either the internal gear elements or the sun gear elements for limited rotational movement and against relative axial movement whereby load during operation can be uniformly distributed among the gear elements.

The invention will become readily apparent from the following detailed description taken in conjunction with the accompanying drawings in which:

FIG. 3 shows a view, on an enlarged scale, of a connecting rod;

FIG. 4 shows a sectional view of a retainer for holding balls between a pair of adjacent internal gear elements;

FIG. 5 shows a fragmental side elevational view of the retainer illustrated in FIG. 4;

FIG. 6 shows a sectional view on an enlarged scale of a spiral spring member disposed between a pair of adjacent internal gear elements; and FIG. 7 shows a fragmental side elevational view of the spring member illustrated in FIG. 6.

Figure 1:
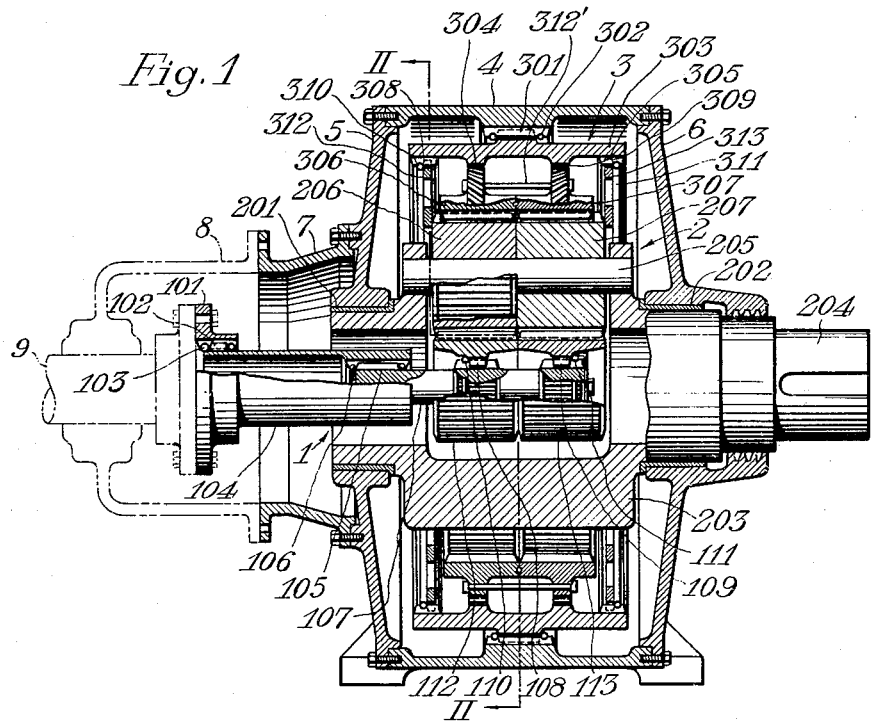
FIG. 1 shows partly in elevation and partly in longitudinal section a planetary gear device constructed according to the teachings of the invention.
Figure 2:
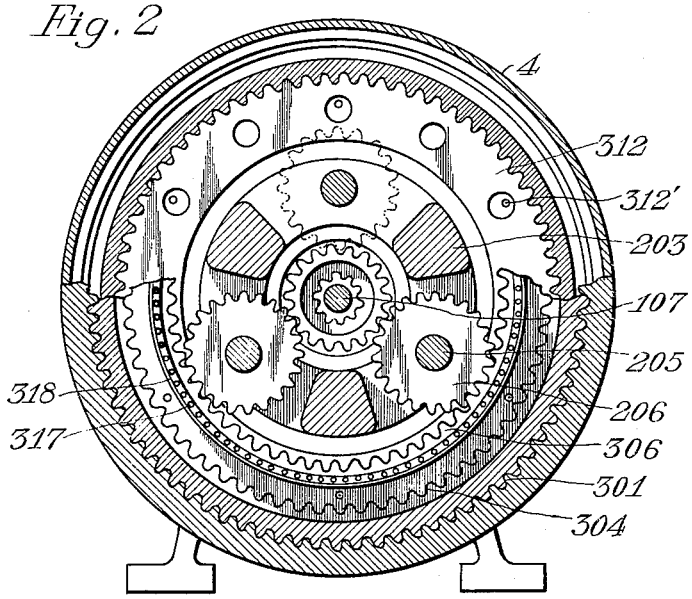
FIG. 2 shows a section taken along the line II—II of FIG. 1.

Referring now to FIGS. 1 and 2 of the drawings, there is illustrated a planetary gear device constructed according to the teachings of the invention. A sun gear unit 1, a planet gear unit 2 and an internal gear unit 3 are disposed within a casing composed of a plurality of cover members 4, 5, 6, 7 and 8. More specifically, within the casing the sun gear unit 1 is centrally disposed for rotation about its own stationary axis while the planet gear unit 2 is arranged to mesh both with the sun gear unit 1 and with the internal gear unit 3 disposed concentrically with the latter and to be revolved about the sun gear unit 1 and along the internal periphery of the internal gear unit 3 with the unit 2 rotating about its axis of rotation. The internal gear unit 3 is normally stationary.

As shown in FIG. 1, a high speed driving or input shaft designated as 9 rigidly connected to a prime mover such as an internal combustion engine (not shown) is connected to the sun gear unit 1 through a flange coupling 101 which, in turn, is coupled to an end portion of a tubular transmission shaft 104 through a gear coupling 102 and a pair of retaining ring members 103. The transmission shaft 104 includes an inner end portion similarly coupled to the shaft 107 of the sun gear unit 1 through a gear coupling 105 and a pair of retaining ring members 106. Thus the shafts 9, 104 and 107 are operatively coupled to each other and prevented from disengaging from each other. The shaft 107 of the sun gear unit 1 is connected to a pair of axially abutting sun gear elements 112 and 113 through a pair of gear couplings 108, 109 and a pair of retaining ring members 110, 111.

Preferably the pair of sun gear elements 112 and 113 consist of a pair of spur gear elements having the same diameter and the same number of teeth and disposed so as to be offset from each other by a half of their tooth pitch.

The sun gear unit 1 is floatingly supported by and inside of the planet gear unit 2 which will now be described.

As shown in FIG. 1 the planet gear unit 2 comprises a gear supporting frame 203 rotatably supported by the cover members 5 and 6 against axial movement and through a pair of bearings 201 and 202 fitted into central openings formed on said cover members respectively. The supporting frame 203 includes a plurality of parallel shafts 205 mounted at both ends thereto and also at its outer end a transmission or output shaft 204 formed integrally therewith. The device illustrated includes three shafts 205 as shown in FIG. 2. Each of the gear shafts 205 includes a pair of planet gear elements 206 and 207 carried thereon with the opposed end faces contacting each other. The planet gear elements are arranged to mesh the respective sun gear elements 112 and 113 which are spur gear elements offset from each other by a half of their pitch as above described. Therefore, it is to be understood that the planet gear elements should be spur gear elements offset from each other by a half of their tooth pitch.

The internal gear unit 3 is a toothed portion floatingly carried by the cover member 4 inside thereof. As illustrated in FIG. 1, the cover member 4 carries on its internal surface a hollow cylindrical member 303 through a gear coupling 301 and a pair of retaining ring members 302 whereby the cylindrical member is prevented from axial movement. The hollow cylindrical member 303 carries a pair of internal gear elements 306 and 307 through a pair of spaced helical gear couplings 304 and 305 provided on the internal surface adjacent its middle and including their peripheries toothed in opposite directions respectively.

The hollow cylindrical member 303 has its end portions projecting beyond the corresponding ends of the planet gear unit 2. On the end portions of the cylindrical member 303 thrust resisting-annular disks 312 and 313 are mounted through gear couplings 308 and 309 and retaining ring members 310 and 311 whereby the planet gear elements are prevented from axial movement. The annular disks 312 and 313 have their respective inner peripheries brought into contact with the side end faces of the corresponding planet gear elements and preferably adjacent to positions in which the corresponding internal gear elements have the respective pitch circles. As is well known, a gear element is in rolling contact with the associated gear element on their pitch circles. Therefore, the arrangement just described makes it possible to greatly reduce the sliding velocity of the side end face of the planet gear element relative to the inner periphery of the thrust resisting disk resulting in a large decrease in frictional loss therebetween.

As shown in FIG. 1 and also on an enlarged scale in FIG. 3, one connecting rod or bolt 312' extends loosely through each of plural pairs of aligned axial bores suitably formed on the pair of internal gear elements 306 and 307 respectively and cooperates with a pair of hemispherical washers 314 and a pair of bolts 313' to effect self-centering and loose connection of the two internal gear elements. A cotter pin 316 (FIG. 3) serves to prevent the bolt 312' from loosening during the operation of the device.

As shown in FIGS. 4 and 5, a multiplicity of balls 317 is held by a retainer 318 and interposed between the opposed faces of the internal gear elements 306 and 307.

In this way one of the internal gear elements is allowed to effect a somewhat angular movement with respect to the other internal gear element.

Alternatively, a spiral spring member designated as 320 in FIGS. 6 and 7 may be substituted for the balls 317 shown in FIG. 4 and 5.

In operation, a prime mover (not shown) rotates through the shafts 9, 104 and 107 the sun planet gear elements 112 and 113 about the common stationary axis which, in turn rotate the planet gear elements 206 and 207 around the sun gears and along the internal periphery of the internal gear elements 306 and 307 while rotating about their axes of rotation. Therefore, the rotational movement of the shaft 9 is transmitted to the output shaft 204 which, in turn is rotated at a speed determined by the numbers of teeth of the gear units 1, 2 and 3.

The helical gear couplings 304 and 305 include teeth formed on their periphery in such oblique directions that, during the rotational movement of the sun gear elements 112 and 113 in one sense axial thrusts provided by the couplings 304 and 305 cause the pair of internal gear elements 306 and 307 to be pushed against each other.

In operation in said one sense, the first gear train of gear elements 112, 206 and 306 may be applied with loads the magnitudes of which are different from those of the second gear train of gear elements 113, 207 and 307 because of the pitch errors and incorrect tooth profiles of the respective gear elements and other reasons. In such case, the thrust which is an axial component of the above-mentioned load and provided by the helical gear coupling 304 will be different from that provided by the gear coupling 305. This causes the internal gear elements 306 and 307 to be moved axially.

For purpose of illustration it is assumed that the first gear train is subject to a larger load or a larger force of rotation than the second gear train. Then the internal gear element 306 in the first gear train will provide an axial thrust larger and in the opposite direction than does the gear element 307 in the second gear train to thereby force the latter element. It is here recalled that both internal gear elements are connected through the connecting rods or bolts 312' to each other for relative angular movement within certain limits. Thus it will be apparent that the internal gear element 306 applied to the larger force of rotation is slightly rotated in the direction of the rotational force whereas the internal gear element 307 subject to the smaller force of rotation is rotated in the opposite direction. This rotational movement is continued until the loads carried by both the internal gear elements respectively are equal to each other whereupon the axial thrusts are in equilibrium. In this way the load of the first gear train is always maintained equal to the load of the second gear train during operation.

If the device illustrated is rotated in the reverse or second sense the internal gear elements 306 and 307 will be applied with forces of rotation respectively to provide axial thrusts tending to move the gear elements away from each other. With the forces of rotation equal to each other, the axial thrusts will cancel each other through the connecting rods or bolts which connect the internal gear elements. On the contrary, if the forces of rotation are different from each other the two internal gear elements will be axially displaced through the connecting rods whereby the equalization of loads will be obtained as in the previous case.

From the foregoing it will be understood that, in operation the axial positions of the internal gear elements 306 and 307 have automatically their axial positions within limits determined by the equalization of loads as above described. However, the planet gear elements 206 and 207 meshing the internal gear elements respectively have their axial positions quite indefinite. Therefore, the planet elements 206 and 207 may be moved in either direction along their common shaft 205 respectively.

The pair of thrust resisting-annular disks 312 and 313 as previously described serve to prevent this axial movement of the planet gear elements. Since the thrust resisting disks 312 and 313 are mounted indirectly to the internal gear elements through the gear couplings 308, 309 and the supporting cylindrical member 303 respectively the device can easily be assembled and disassembled and simultaneously the internal gear elements are allowed to have limited looseness and flexibility.

As previously pointed out, each of the gear elements in the first gear train is offset from the associated gear element in the second gear train by a half of the corresponding tooth pitch. With this arrangement it is possible to double the number of simultaneously meshed teeth as compared with the case of aligning teeth on a pair of mating gear elements to thereby ensure smooth and silent operation.

When a pair of gear elements such as the internal or sun gear elements to be connected to each other through a pair of single helical gear couplings toothed in opposite direction are mounted on the associated shaft in alignment or in offset state such gear elements can be displaced axially with respect to said gear couplings to thereby be relatively rotated in opposite directions whereby a small pitch error can be compensated for. For a large pitch error, such compensation can readily be performed by choosing a tooth number for the gear element and a tooth number for the associated gear coupling such that they have no common measurement or divisor. Thus the meshing of the gear coupling with the gear element may be changed inch by inch to adjust precisely the relative position of the gear elements. Alternatively tooth numbers of the two gear couplings may have no common divisor in order to effect such adjustment.

From the foregoing it will be appreciated that the invention has provided a planetary gear device of the spur gear type suitable for transmitting a relatively high power therethrough which can effectively compensate for any twist of the support frame for supporting the planet gear elements, and hence the shafts of the latter gear elements, caused by the fact that power is taken out from an output shaft forming one end portion of the support frame, any pitch error of each of the gear elements due to machining of the same, and any misalignment in meshing caused from incorrect profile of tooth and wrong assembling.

While the invention has been described in terms of the spur gear type, the single helical type of gear elements for power transmission can be advantageously used with the invention. In this case either a sun gear unit or an internal gear unit may comprise a pair of axially abutting, single helical gear elements connected to each other through a pair of single helical gear couplings toothed in opposite directions. The tooth direction of the gear coupling is determined on the basis of the consideration previously described in conjunction with the single gear couplings 304 and 305. Also a plurality of connecting rods or bolts such as 312′ may be provided for preventing a pair of connected gear elements from moving away from each other.

Since the invention uses the spur or single helical type of gear elements for power transmission, machining operations for producing the same, including tooth cutting, shaving, hardening, grinding etc. can be easily and precisely performed.

Although the gear elements of either the internal gear unit or the sun gear unit are necessarily toothed in opposite directions for meshing the single helical gear couplings such teeth are arranged to effect simultaneous meshing and hence may be of a smaller breadth than teeth for power transmission, resulting in facilitation of their manufacturing. The associated helical gear coupling is the case. The paired, single helical gear couplings as a whole may be regarded as a single structure of double helical gear coupling. Then it will be seen that, between the paired couplings a sufficiently wide space is left into which a working portion, a cutting tool or of a grinding wheel can be withdrawn during the machining operation. Therefore, the gear couplings can be very easily made.

Although the invention has been described in conjunction with certain embodiments thereof it is to be understood that various changes and modifications may be made without departing from the spirit and scope of the invention. For example, more than two and preferably even number more than two axially abutting gear elements may be, if desired, provided in each of the sun, planet and internal gear units. If four gear elements are used in each, unit one gear element may be preferably offset from the adjacent gear elements by a quarter of their tooth pitch. The arrangement of single helical gear couplings and connecting rods may be associated with the sun gear elements on the internal surfaces thereof. The sun gear unit may be of unitary structure.

What I claim is:

1. A planetary gear device comprising, a driven sun gear shaft, a plurality of abutting sun gears mounted on said sun gear shaft, a plurality of abutting internal gears disposed coaxially with said sun gears, a plurality of planet gear groups disposed between said sun gears and said internal gears, each of said planet gear groups including a plurality of separate abutting planet gears meshing both with said sun gears and said internal gears, said sun gears, said internal gears and said planet gears in each planet gear group being equal in number, frame means for rotatably supporting said planet groups, a casing surrounding said internal gears and at least one pair of single helical gear couplings toothed in opposite directions for coupling at least two gears selected from said internal gears and said sun gears, whereby the coupled gears are relatively rotational and prevented from relative axial movement.

2. A planetary gear device according to claim 1, in which all of the gears are spur gears.

3. A planetary gear device according to claim 1, in which said sun gears, the planet gears and the internal gears comprise groups of axially disposed gears respectively and wherein each of said gears in each group is offset from the adjacent gears by a predetermined fraction of their tooth pitch.

4. A planetary gear device according to claim 1, comprising a connecting rod for loosely connecting a pair of axially abutting gears.

5. A planetary gear device according to claim 1, wherein the number of teeth of at least one of the sun gears and the internal gears and number of teeth of the associated gear coupling are chosen to have no common divisor.

6. A planetary gear device according to claim 1, in which the number of teeth of said single helical gear couplings are chosen to have no common divisor.

7. In a planetary gear device, comprising, a driven sun gear shaft, for power transmission, a sun gear unit having a plurality of abutting sun gear elements on said shaft and an internal gear unit including a pair of axially abutting gear elements coaxial with said sun gear elements and equal in number to said sun gear elements, a plurality of separate abutting planet gear elements meshing with both said sun gear elements and said internal gear elements, frame means rotatably supporting said plane gear elements, and a pair of single helical gear couplings toothed in opposite directions for coupling to each other a pair of gears selected from said internal gear elements and said sun gear elements, whereby said coupled gears are relatively rotational and prevented from relative axial movement.

8. A planetary gear device according to claim 7, in which the sun gear unit, the planet gear unit and the internal gear unit comprise groups of axially disposed gear elements respectively and in which each of said gear elements in each group is offset from the adjacent gear elements by a predetermined fraction of their tooth pitch.

9. A planetary gear device according to claim 7, comprising a thrust resisting annular disk in contact with each of end faces of the planet gear unit adjacent to the pitch circle of said at least one sun gear unit and the internal gear unit.

10. A planetary gear device according to claim 7, in which the number of teeth of said at least one of the sun gear element and said internal gear element and the number of teeth of the associated gear coupling are chosen to have no common divisor.

11. A planetary gear device according to claim 7, in which the number of teeth of said single helical gear couplings are chosen to have no common divisor.

12. A planetary gear device comprising a sun gear element of unitary structure, a plurality of abutting internal gear elements disposed coaxially with said sun gear element, a plurality of planet gear groups disposed between said sun gear element and said internal gear elements, each of said planet gear groups including a plurality of separate abutting planet gear elements meshing both with said sun gear element and with said internal gear elements, said internal gear elements and said planet gear elements in each planet gear group being equal in number, frame means for rotatably supporting said planet gear groups, a casing surrounding said internal gear element, and at least a pair of single helical gear couplings toothed in opposite directions for coupling at least two gear elements selected from said internal gear elements, whereby the coupled gear elements are allowed to effect relative rotational movement but prevented from relative axial movement.

References Cited by the Examiner
UNITED STATES PATENTS

| | | | |
|---|---|---|---|
| 2,700,311 | 1/55 | Bade | 74—410 X |
| 2,703,021 | 3/55 | Stoeckicht | 74—410 |
| 2,830,473 | 4/58 | Brown | 74—409 X |
| 2,926,550 | 3/60 | Stoeckicht | 74—675 |

DON A. WAITE, *Primary Examiner.*

BROUGHTON G. DURHAM, *Examiner.*